(12) United States Patent
Zhou (10) Patent No.: US 11,433,607 B2
(45) Date of Patent: Sep. 6, 2022

(54) DISCHARGE APPARATUS AND 3D PRINTING DEVICE THEREOF

(71) Applicant: Nanjing Wiiboox 3D Technology Co., Ltd., Nanjing (CN)

(72) Inventor: Haipeng Zhou, Nanjing (CN)

( * ) Notice: Subject to any disclaimer, the term of this patent is extended or adjusted under 35 U.S.C. 154(b) by 0 days.

(21) Appl. No.: 17/320,724

(22) Filed: May 14, 2021

(65) Prior Publication Data
US 2022/0227045 A1    Jul. 21, 2022

(30) Foreign Application Priority Data

Jan. 15, 2021  (CN) .......................... 202120117097.X
Mar. 29, 2021  (CN) .......................... 202120633194.4

(51) Int. Cl.
*B29C 64/209*    (2017.01)
*B29C 64/295*    (2017.01)
*B33Y 50/02*    (2015.01)
*B33Y 30/00*    (2015.01)

(52) U.S. Cl.
CPC .......... *B29C 64/209* (2017.08); *B29C 64/295* (2017.08); *B33Y 30/00* (2014.12); *B33Y 50/02* (2014.12)

(58) Field of Classification Search
CPC ..... B29C 64/209; B29C 64/295; B33Y 30/00; B33Y 50/02
See application file for complete search history.

(56) References Cited

U.S. PATENT DOCUMENTS

| | | | |
|---|---|---|---|
| 2012/0251689 A1* | 10/2012 | Batchelder | A23G 3/0242 99/450.1 |
| 2017/0190105 A1* | 7/2017 | Huang | H05B 3/44 |
| 2018/0043612 A1* | 2/2018 | Gray | B29C 35/16 |
| 2020/0086577 A1* | 3/2020 | Pappas | B29C 64/245 |
| 2020/0138053 A1* | 5/2020 | Aydin | B65D 85/72 |
| 2021/0112845 A1* | 4/2021 | Fan | A23P 20/20 |
| 2022/0128581 A1* | 4/2022 | Martinez | B01L 7/04 |

FOREIGN PATENT DOCUMENTS

CN    206025171    *  3/2017

OTHER PUBLICATIONS

Translation of CN 206025171 (Year: 2017).*

* cited by examiner

*Primary Examiner* — Mary Lynn F Theisen
(74) *Attorney, Agent, or Firm* — Rumit Ranjit Kanakia (57) ABSTRACT

The present disclosure relates to a discharging apparatus and a 3D printing device thereof, which pertains to the field of the 3D printing device. The discharging apparatus includes a housing, a driving module, and a heating module. The housing includes a body portion, and a movable portion detachably or rotatably connected to the body portion, wherein one end of the body portion is provided with a discharging hole, and in an operating state, the body portion and the movable portion form a relatively enclosed accommodating space. One end of the driving module is connected to the body portion, and the other end of the driving module is movable by a predetermined distance in the accommodating space. The heating module is attached to an inner wall of the body portion and/or the movable portion. In the present disclosure, the heating module is configured to adjust a heating temperature for heating according to a property of a printing material/or a discharging parameter, such that the heating temperature of the heating module is adjusted according to a food material with different molten properties, and 3D printing is practiced using different printing materials. In this way, the problem that an existing chocolate 3D printer can only use chocolate with single purity for the 3D printing and adaptability is poor is solved.

12 Claims, 7 Drawing Sheets

DISCHARGE APPARATUS AND 3D PRINTING DEVICE THEREOF

TECHNICAL FIELD

The present disclosure relates to the field of 3D printing devices, and in particular, relates to a discharging apparatus and a 3D printing device thereof.

BACKGROUND

A temperature and a discharging speed of a discharging apparatus of an existing food 3D printer are not adjustable, and the food 3D printer is not applicable to foods at melting points. Taking chocolates for example, the chocolates with different purities have different melting points. Therefore, the problem that an existing chocolate 3D printer can only use chocolate with single purity for the 3D printing and adaptability is poor is present.

SUMMARY

The present disclosure is intended to provide a discharging apparatus and a 3D printing device thereof to solve the problem in the related art.

The discharging apparatus includes a housing including a body portion, and a movable portion detachably or rotatably connected to the body portion, wherein one end of the body portion is provided with a discharging hole, and in an operating state, the body portion and the movable portion form a relatively enclosed accommodating space;

a driving module, wherein one end of the driving module is connected to the body portion, and the other end of the driving module is movable by a predetermined distance in the accommodating space; and a heating module attached to an inner wall of the body portion and/or the movable portion, wherein the heating module is configured to adjust a heating temperature for heating according to a property of a printing material/or a discharging parameter.

In a further embodiment, the discharging apparatus further includes a stocker disposed in the accommodating space and detachably mounted to the body portion, wherein the stocker is communicated with the discharging hole.

In the operating state, the other end of the driving module extends into the stocker.

In a further embodiment, the discharging apparatus further includes a temperature detecting unit and a digital display unit;

wherein the temperature detecting unit is disposed in an inner wall of the housing, and configured to detect a temperature of the accommodating space; and wherein the digital display unit is connected to the temperature detecting unit and/or the heating module, and configured to display the temperature of the accommodating space and/or set a temperature value. A temperature of the printing material in the stocker is detected by the temperature detecting unit, and is displayed by the digital display unit, such that a printing material in the stocker may be indicated to the user. In this way, products are printed after the printing material is heated to a molten state, which improves accuracy and appearance of the printed products.

In a further embodiment, the discharging apparatus further includes an input module, wherein the input module is configured to input a control parameter to the heating module and the driving module.

In a further embodiment, a magnetic power supplying key structure is disposed at a joint between the movable portion and the body portion, wherein the magnetic power supplying key structure includes at least two pairs of magnetic particles, and a male pin and a female socket that mate with each other by plugging;

wherein each pair of magnetic particles magnetize each other, are correspondingly disposed on the body portion and the movable portion, and are configured to fix the movable portion and the body portion; and wherein the male pin and the female socket are correspondingly mounted on the movable portion and the body portion. When the male pin is in contact with the female socket, the heating module on the movable portion is electrically conducted. By the male pin and the female socket, the heating module on the movable portion is supplied power as soon as the movable portion is closed, thereby simplifying operations and a connecting structure, and solving the problem that wiring is troublesome in wired connection and the printed product may be mis-touched.

In a further embodiment, the heating module includes an aluminum heating tile, and a PI heating film attached to an outer wall of the aluminum heating tile. The heating module compositely made from the aluminum heating tile and the PI heating film greatly reduces manufacture difficulty and cost, and as a metal with a high thermal conduction efficiency, aluminum has advantages of small density and light weight.

In a further embodiment, the driving module includes a power source, wherein the power source is fixedly connected to the body portion, and configured to output power;

a transmission assembly, wherein the transmission assembly is connected to the power source, and configured to convert rotation output by the power source into a linear reciprocating movement; and a piston, wherein the piston is connected to the transmission assembly, sealedly mates with an inner wall of a stocker, and linearly reciprocates in the stocker.

In a further embodiment, the heating module further includes a metallic heating head detachably or fixedly connected to the discharging hole, wherein the metallic heating head is provided with a material through-hole along an axial direction of the metallic heating head, and is configured to heat the printing material in the material through-hole and at an end portion of the material through-hole. The printing material in the discharging hole and at an end portion of the discharging hole are heated again by the metallic heating head, such that the problem that the discharging hole is congested and fails to discharge materials because the printing material is condensed at the discharging hole due to over-low temperature is solved.

In a further embodiment, the metallic heating head includes a heating block detachably or fixedly connected to the accommodating space, wherein the heating block is provided with a mounting through-hole along an axial direction of the discharging hole; and a discharging head detachably or fixedly connected to the mounting through-hole, wherein the discharging head is provided with the material through-hole along the axial direction of the discharging hole;

wherein the heating block is configured to heat the printing material on the discharging head, in the installation through-hole, in the material through-hole, and at the end portion of the material through-hole.

In a further embodiment, the discharging apparatus further includes a connecting frame detachably or fixedly connected to the body portion, wherein the connecting frame is configured to be connected to a 3D printer. With the configuration of a printer connecting frame detachably or fixedly connected to the housing, a corresponding printer connecting frame may be replaced according to the type of the 3D printer, and hence the discharging apparatus is mounted on the 3D printer for 3D printing, which greatly improves market benefit and lowers modification difficulty.

In a further embodiment, the driving module includes a power source, wherein the power source is fixedly connected to the housing, and configured to output power;

a transmission assembly, wherein the transmission assembly is connected to the power source, and configured to convert rotation output by the power source into a linear reciprocating movement; and a plunger, wherein the plunger is connected to the transmission assembly, and configured to linearly reciprocates in a stocker;

An end portion of the stocker sealedly mates with the housing. Based on plunger extrusion and mating between the end portion of the stocker and the housing, a polygonal cartridge with a section of a triangle, a quadrangle, or the like, may be used as the stocker.

The 3D printing device based on the discharging apparatus includes the above discharging apparatus.

The magnetic power supplying key structure applicable to the discharging apparatus includes a male pin key and a female socket key that are separate from each other. The male pin key is provided with the male pins, and the female socket key is provided with the female sockets at corresponding positions. The male pin key and the female socket key are provided with magnetic particles that magnetizes each other. The male pins and the female sockets are made of a conductive metal material, and the male pin key and the female socket key are made of an insulating material. The male pins, the female sockets, and the magnetic particles are respectively integrated into the male pin key and the female socket key. In this way, an assembly process of the discharging apparatus is simplified, and production efficiency is improved.

In a further embodiment, two ends of the male pin key are both provided with the magnetic particles, and two ends of the female socket key are both provided with the magnetic particles. The male pin is disposed at a middle portion of the male pin key, and the female socket is disposed at a middle portion of the female socket key.

In a further embodiment, the male pin may be telescopically mounted on the male pin key.

The discharging apparatus and the 3D printing device thereof according to the present disclosure achieve the following beneficial effects: The heating module is configured to adjust a heating temperature for heating according to a property of a printing material/or a discharging parameter, such that the heating temperature of the heating module is adjusted according to a food material with different molten properties, and 3D printing is practiced using different printing materials. In this way, the problem that an existing chocolate 3D printer can only use chocolate with single purity for the 3D printing and adaptability is poor is solved.

Reference numerals and denotations thereof in FIG. 1 to FIG. 7: 1—housing, 2—heating module, 3—driving module, 4—control module, 5—revolving door, 6—magnetic power supplying key structure, 7—printer connecting frame, 8—discharging head, 9—heating block, 10—metallic heating head, 31—power source, 32—transmission assembly, 33—piston, 41—digital display unit, 42—control key, 43—temperature detecting unit, 61—magnetic particle, 62—male pin, 63—female socket, 101—stocker, 621—male pin key, and 631—female socket key.

DETAILED DESCRIPTION

In the description hereinafter, a large number of details are given to facilitate thorough understanding of the present disclosure. However, it is obvious to a person skilled in the art that the present disclosure may be practiced without one or more of such details. In other examples, for prevention of confusion with the present disclosure, some technical features commonly known in the art are not described.

The present disclosure discloses a 3D printing device. The 3D printing device includes a discharging apparatus capable of adjusting a heating temperature of a heating module according to a food material with different molten properties.

The discharging apparatus includes a housing 1, a heating module 2, a driving module 3, a revolving door 5, magnetic power supplying key structure 6, a printer connecting frame 7, a discharging head 8, a heating block 9, a power source 31, a transmission assembly 32, a piston 33, a digital display unit 41, a control key 42, a temperature detecting unit 43, a magnetic particle 61, a male pin 62, a female socket 63, a stocker 101, a male pin key 621, and a female socket key 631.

The housing 1 includes a body portion, and a movable portion detachably or rotatably connected to the body portion, wherein one end of the body portion is provided with a discharging hole, and in an operating state, the body portion and the movable portion form a relatively enclosed accommodating space.

Figure 1:
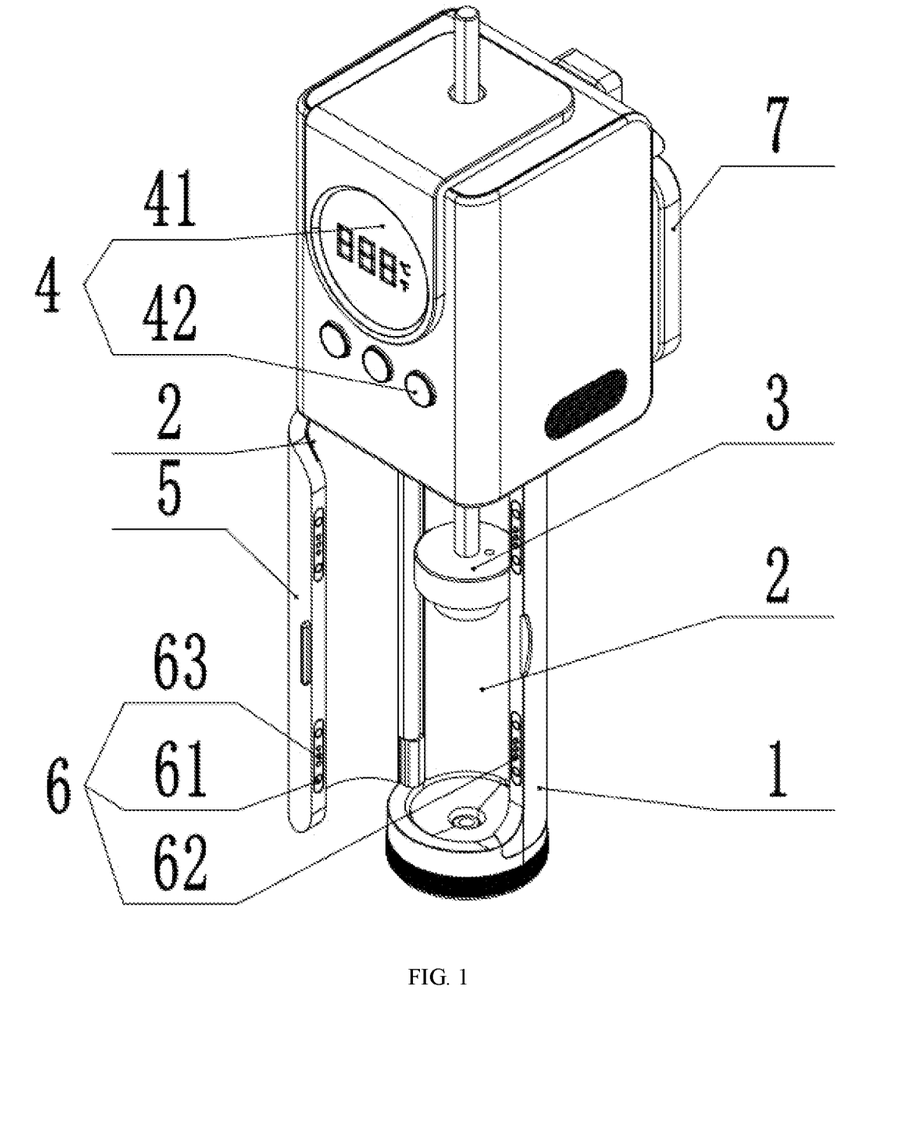
FIG. 1 is a schematic axial side view of the present disclosure.
Figure 2:
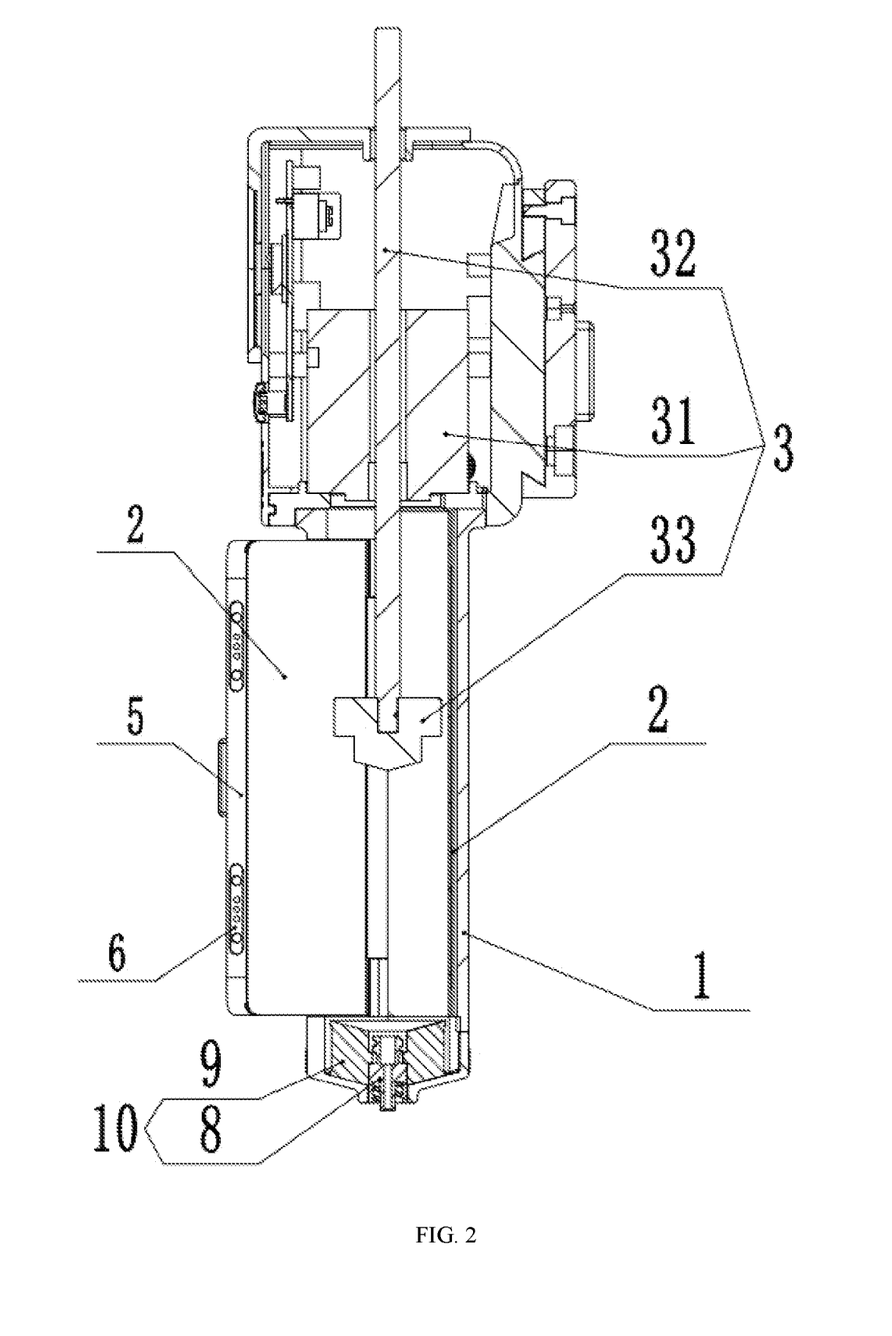
FIG. 2 is a schematic side sectional view of the present disclosure.
Figure 3:
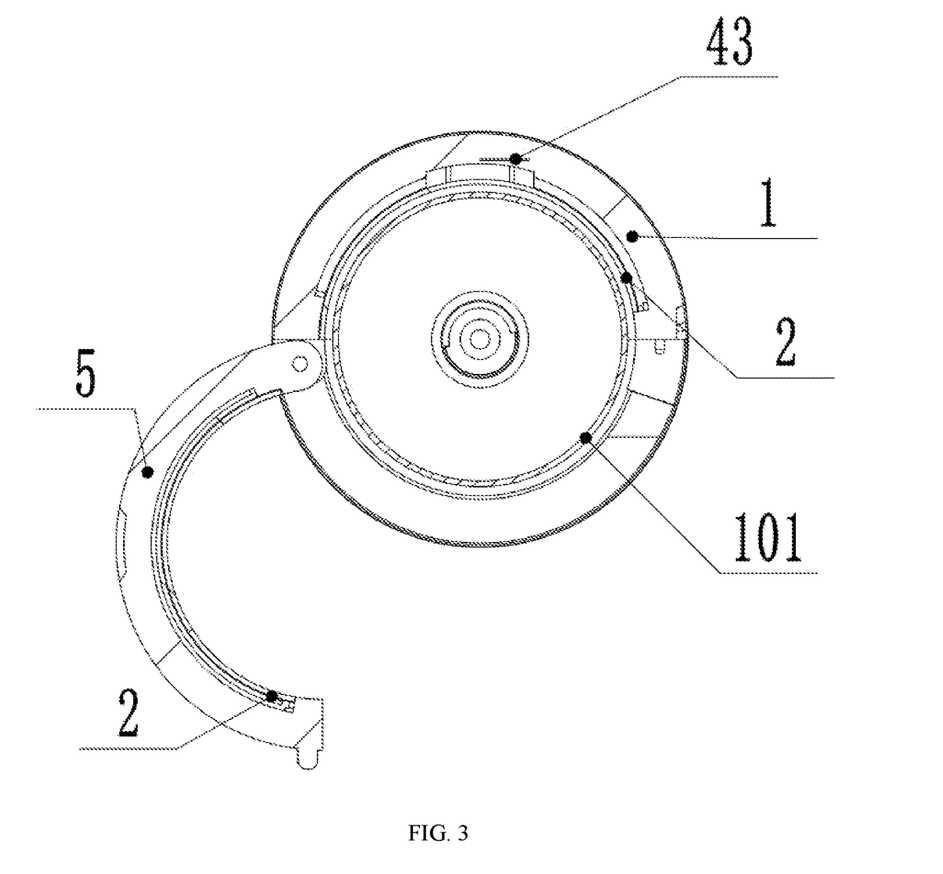
FIG. 3 is a schematic top sectional view of the present disclosure.

In the embodiments as illustrated in FIG. 1, FIG. 2, and FIG. 3, the movable portion used by the housing 1 is the revolving door 5 rotatably connected to the body portion.

One end of the driving module 3 is connected to the body portion, and the other end of the driving module 3 is movable by a predetermined distance in the accommodating space.

The heating module 2 is attached to an inner wall of the body portion and/or the movable portion. The heating module 2 is configured to adjust a heating temperature and heat according to a property of a printing material/or a discharging parameter. The heating module 2 may be implemented by a hardware circuit, for example, by adjustable resistors or resistors connected in series and in parallel; or by a controller, for example, a microcontroller unit or the like based on an existing Packet Identifier (PID) module. The temperature is controlled by adjusting a set parameter of the existing PID module, for example, by adjusting a parameter adjust box in a user interface, or increasing or decreasing related parameters by a physical key without modifying software, thereby implementing control of the temperature.

Operating principles: The heating module 2 is configured to adjust a heating temperature for heating according to a property of a printing material/or a discharging parameter, such that the heating temperature of the heating module 2 is adjusted according to a food material with different molten properties, and 3D printing is practiced using different printing materials. In this way, the problem that an existing chocolate 3D printer can only use chocolate with single purity for the 3D printing and adaptability is poor is solved.

In this embodiment, the discharging apparatus further includes a stocker 101 disposed in the accommodating space and detachably mounted to the body portion, wherein the stocker 101 is communicated with the discharging hole.

In the operating state, the other end of the driving module 3 extends into the stocker 101.

The stocker 101 may be in a cylindrical structure with a circular section, or may be in a polygonal cylindrical structure with a section having at least three sides, for example, a triangle, a quadrangle, a pentagon, or the like, or may be in the cylindrical structure with an elliptical section.

For observation a residual quantity of the printing material in the stocker 101, the stocker 101 may be made of a transparent material, such as a transparent glass, an acrylic material, or a transparent plastic.

The movable portion may also be made of transparent glass, an acrylic material, or a transparent plastic. Alternatively, an observation hole is disposed on a side of the movable portion and/or the body portion, and an observation window made of a transparent glass, an acrylic material, or a transparent plastic may be further disposed in the observation hole.

In a further embodiment, in the related art, the 3D printer is only capable of displaying a moving speed, a direction, and an operating state of a displacement device thereof, but is incapable of displaying a real-time temperature of the printing material inside the stocker 101. Therefore, during use, printing is started before the printing material in the stocker 101 is heated to the molten state, and as a result the printed products have a low precision and a poor appearance.

To solve the above problem, the discharging apparatus further includes the temperature detecting unit 43 and the digital display unit 41.

The temperature detecting unit 43 is disposed in an inner wall of the housing 1, and configured to detect a temperature of the accommodating space.

The digital display unit 41 is connected to the temperature detecting unit 43 and/or the heating module 2, and configured to display the temperature of the accommodating space and/or set a temperature value.

In this embodiment, the digital display unit 41 may be a device capable of displaying a temperature, such as a liquid crystal digitron, a liquid crystal display screen, or an organic light-emitting diode (OLED) display screen. In a further embodiment, the digital display unit 41 may further display state information, for example, a speed of the driving module 3.

In the embodiments as illustrated in FIG. 1 and FIG. 2, the digital display unit 41 is a tribit liquid crystal digitron.

A temperature of the printing material in the stocker 101 is detected by the temperature detecting unit 43, and is displayed by the digital display unit 41, such that a printing material in the stocker 101 may be indicated to the user. In this way, products are printed after the printing material is heated to a molten state, which improves accuracy and appearance of the printed products.

In a further embodiment, the discharging apparatus further includes an input module, wherein the input module is configured to input a control parameter to the heating module 2 and the driving module 3.

The input module may be a roller wheel structure for controlling the heating temperature of the heating module 2, a key structure for inputting an instruction, or a touchscreen structure.

In the embodiments as illustrated in FIG. 1 and FIG. 2, the input module includes at least three control keys 42. By cooperation of the three control keys 42, the heating temperature of the heating module 2 may be set, the moving direction of the driving module 3 may be controlled, a turn-on or turn off or standby state of the heating module 2 and the driving module 3 may be controlled. For example, among the three control keys 42, one is a turn-on key, one is an up key, and the remaining one is a down key. The discharging apparatus is started when the turn-on key is long pressed, and power is supplied to the driving module 3 and the temperature detecting unit 43, such that the driving module 3 and the temperature detecting unit 43 enters the standby state. When the turn-on key is short pressed, a function setting region of the discharging apparatus is activated. The function parameters to be set are switchable by short pressing in the function setting period. After a function parameter to be set is selected, the function parameter may be adjusted by the up key or the down key. In the standby state, the up key and the down key fail in response to short pressing. Where the stocker 101 needs to be replaced, the up key is long pressed such that the driving module 3 moves towards a direction far away from the discharging hole, and a spacing between the driving module 3 and the discharging hole is greater than a height of the stocker 101. After the stocker 101 is assembled and the movable portion is closed such that the body portion and the movable portion define a relatively closed accommodating space, the down key is long pressed such that the driving module 3 moves towards a direction proximal to the discharging hole, and the driving module 3 extends into the stocker 101 for printing.

In a further embodiment, with respect to replacement of the conventional stocker 101, the movable portion is opened and the empty stocker 101 is taken out, and a fed stocker 101 is placed therein. However, after the revolving door 5 is closed, the power cable needs to be connected to supply power to the heating module 2 on the revolving door 5, such that the printing material in the stocker 101 is uniformly heated. In the conventional wired connection, the wiring is troublesome, and the printed products may be mis-touched.

To solve the above problem, a magnetic power supplying key structure 6 is disposed at a joint between the movable portion and the body portion, wherein the magnetic power supplying key structure 6 includes at least a pair of magnetic particles 61, and a male pin 62 and a female socket 63 that mate with each other by plugging.

Each pair of magnetic particles 61 magnetize each other, are correspondingly disposed on the body portion and the movable portion, and are configured to fix the movable portion and the body portion.

The male pin 62 and the female socket 63 are correspondingly mounted on the movable portion and the body portion, and the heating module 2 disposed on the movable portion is electrically conducted in response to the male pin 62 and the female socket 63 being in contact with each other.

In this embodiment, the male pin 62 is in a telescopic structure, and formed of a spring and a metallic pin. The spring is configured to reset, and the metallic pin is configured to be electrically conducted. The spring may be accommodated in the metallic pin, or may be abutted with an end of the metallic pin.

The magnetic particles 61 of the magnetic power supplying key structure 6 may secure the movable portion to the body portion. By the male pin 62 and the female socket 63, the heating module 2 on the movable portion is supplied power as soon as the movable portion is closed, thereby simplifying operations and a connecting structure, and solving the problem that wiring is troublesome in wired connection and the printed product may be mis-touched.

In a further embodiment, an existing heating module 2 is made of a ceramic material, but the ceramic material has a property of great hardness. Therefore, problems that a manufacture difficulty is great and the cost is high may exist.

To solve the above problem, the heating module 2 includes an aluminum heating tile, and a PI heating film attached to an outer wall of the aluminum heating tile.

The heating module 2 compositely made from the aluminum heating tile and the PI heating film greatly reduces manufacture difficulty and cost, and as a metal with a high thermal conduction efficiency, aluminum has advantages of small density and light weight.

In a further embodiment, the driving module 3 includes a power source 31, wherein the power source 31 is fixedly connected to the body portion, and configured to output power;

a transmission assembly 32, wherein the transmission assembly 32 is connected to the power source 31, and configured to convert rotation output by the power source 31 into a linear reciprocating movement; and a piston 33, wherein the piston 33 is connected to the transmission assembly 32, sealedly mates with an inner wall of a stocker 101, and linearly reciprocates in the stocker 101.

The transmission assembly 32 may be a rectilinear motion mechanism, such as a screw mechanism, a gear rack mechanism. In the embodiments as illustrated in FIG. 1 and FIG. 2, a screw mechanism is used.

In a further embodiment, the discharging hole is congested and fails to discharge materials because the printing material is condensed at the discharging hole due to over-low temperature.

To solve the above problem, the heating module further includes a metallic heating head 10 detachably or fixedly connected to the discharging hole, wherein the metallic heating head 10 is provided with a material through-hole along an axial direction of the metallic heating head 10, and is configured to heat the printing material in the material through-hole and at an end portion of the material through-hole.

In a further embodiment, in the embodiments as illustrated in FIG. 1 and FIG. 2, the metallic heating head 10 includes a heating block 9 and a discharging head 8.

The heating block 9 is detachably or fixedly connected to the accommodating space, wherein the heating block is provided with a mounting through-hole along an axial direction of the discharging hole.

The discharging head 8 is detachably or fixedly connected to the mounting through-hole, wherein the discharging head is provided with the material through-hole along the axial direction of the discharging hole.

The heating block is configured to heat the printing material on the discharging head, in the installation through-hole, in the material through-hole, and at the end portion of the material through-hole.

The discharging head 8 and/or the heating block 9 may be manufactured in different sizes and inner diameters as required, or may be replaced according to printing needs. The heating block 9 may be made of a metallic material with the high thermal conduction efficiency, such as an aluminum material, a stainless steel material, or a copper material. In addition, an outer side of the metallic material is attached to the PI heating film, or sleeved with a heating ring configured to heat the discharging head 8.

In the above embodiment, the metallic heating head 10 may be an integral structure, or may include a discharging head 8 and a heating block 9. The body portion 1, the discharging head 8, and the heating block 9 may be securely connected to each other by an interference fit based on extrusive deformation, or welding, or fusion splicing or adhesive bonding, or may be detachably connected to each other by threaded connection or snapping.

The printing material in the discharging hole and at an end portion of the discharging hole are heated again by the metallic heating head 10, such that the problem that the discharging hole is congested and fails to discharge materials because the printing material is condensed at the discharging hole due to over-low temperature is solved. In a further embodiment, the body portion of an existing discharging apparatus only mates with an adaptive 3D printer. As a result, market benefit is low and modification difficulty is great.

To solve the above problem, the discharging apparatus further includes a connecting frame detachably or fixedly connected to the body portion, wherein the connecting frame is configured to be connected to a 3D printer.

The body portion and the connecting frame may be detachably connected by threaded connection by screws or snapping. The body portion is securely connected to the connecting portion by integral injection modeling or welding or fusion splicing or adhesive bonding. Secured connection between the body portion and the connecting frame may also be practiced by the threaded connection by screws or the snapping. With the configuration of a printer connecting frame 7 detachably or fixedly connected to the housing 1, a corresponding printer connecting frame 7 may be replaced according to the type of the 3D printer, and hence the discharging apparatus is mounted on the 3D printer for 3D printing, which greatly improves market benefit and lowers modification difficulty.

In a further embodiment, since the piston 33 needs to engage in sealing with the stocker 101 and facilitates material discharging by displacement in the stocker 101, wear of the piston is severe due to friction. In addition, sealing between the piston 33 and the inner wall of the stocker 101 imposes a higher requirement on process and technique. Therefore, for adaptation to the sealing and reduction of the process cost, the stocker 101 is designed to a circular cartridge structure, and thus transportation efficiency of the stocker 101 is low.

To solve the above embodiment, the driving module 3 includes a power source 31, wherein the power source 31 is fixedly connected to the housing 1, and configured to output power;

a transmission assembly 32, wherein the transmission assembly 32 is connected to the power source 31, and configured to convert rotation output by the power source 31 into a linear reciprocating movement; and a plunger, wherein the plunger is connected to the transmission assembly 32, and configured to linearly reciprocates in a stocker 101;

wherein an end portion of the stocker 101 sealedly mates with the housing 1.

In this embodiment, a sealing block is elastically mounted at a top of the accommodating space of the body portion. The sealing block is elastically mounted by a spring. The sealing block is made of an elastic material such as a rubber block. When the plunger rises to a prescribed position, the plunger starts to drive the sealing block to move upward. When the sealing block and the plunger are both moved to be higher than the stocker 101, the stocker 101 may be taken out.

The stocker 101 in this embodiment may be a cartridge with a section of a circle, may be a polygonal cartridge with a section of a triangle, a quadrangle, or the like, or may be a cartridge with a section of an ellipse.

The sealing block ensures sealing of the stocker 101. The plunger extrudes the printing material outside. By these two parts, the sealing and power making are respectively practiced, which may reduce wear due to friction and prolong life time of the discharging apparatus.

In this embodiment, based on plunger extrusion and mating between the end portion of the stocker 101 and the housing 1, a polygonal cartridge with a section of a triangle, a quadrangle, or the like, may be used as the stocker 101; or the stocker 101 may have a section of an ellipse. With such configuration, the transportation efficiency of the stocker 101 is improved.

In a further embodiment, the magnetic power supplying key structure 6 applicable to the discharging apparatus includes a male pin key 621 and a female socket key 631 that are separate from each other. The male pin key 621 is provided with the male pins 62, and the female socket key 631 is provided with the female sockets 63 at corresponding positions. The male pin key 621 and the female socket key 631 are provided with magnetic particles 61 that magnetize each other. The male pins 62 and the female sockets 63 are made of a conductive metal material, and the male pin key 621 and the female socket key 631 are made of an insulating material.

In a further embodiment, two ends of the male pin key 621 are both provided with the magnetic particles 61, and two ends of the female socket key 631 are both provided with the magnetic particles 61. The male pin 62 is disposed at a middle portion of the male pin key 621, and the female socket 63 is disposed at a middle portion of the female socket key 631.

Figure 4:
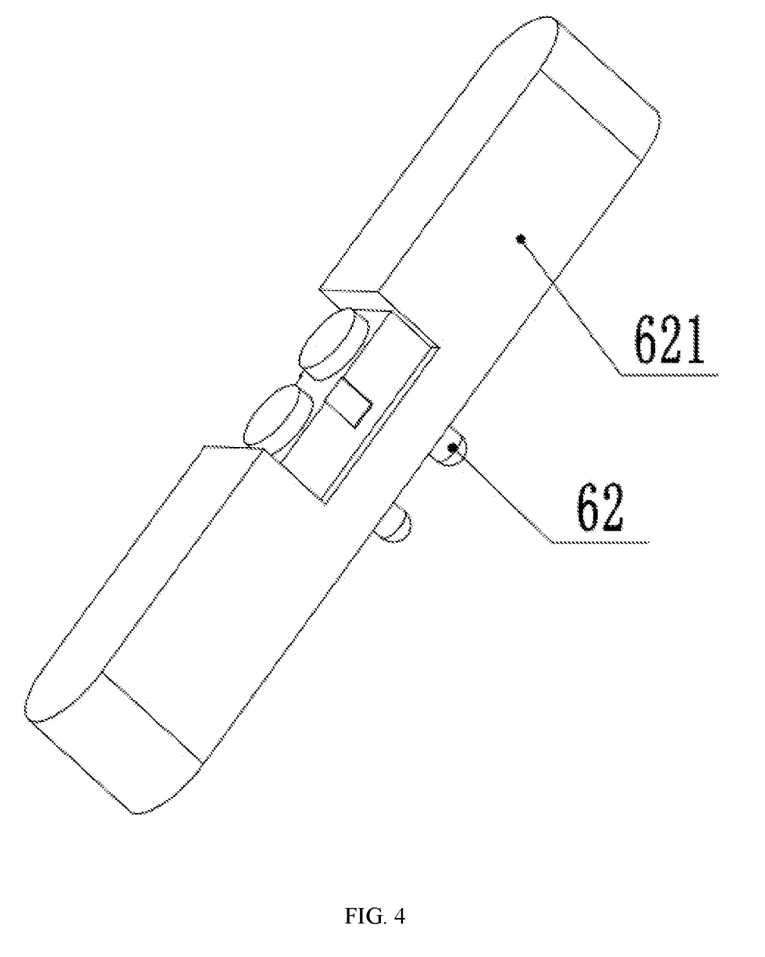
FIG. 4 is a schematic view of a male pin key according to the present disclosure.
Figure 5:
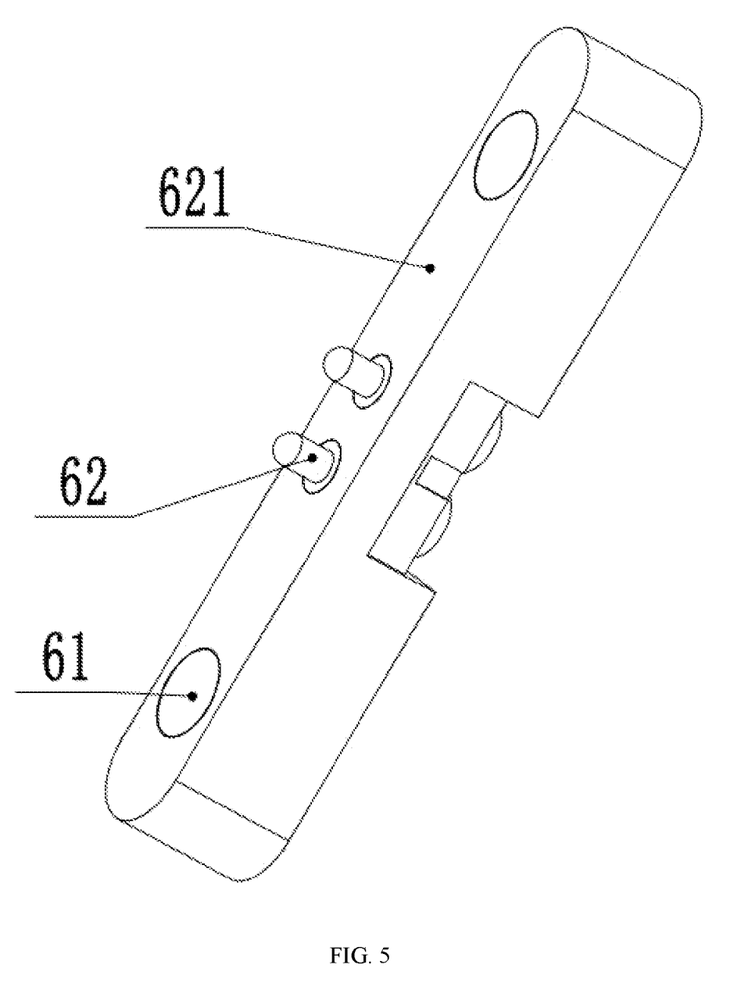
FIG. 5 is a schematic view of a male pin key and a magnetic particle according to the present disclosure.
Figure 6:
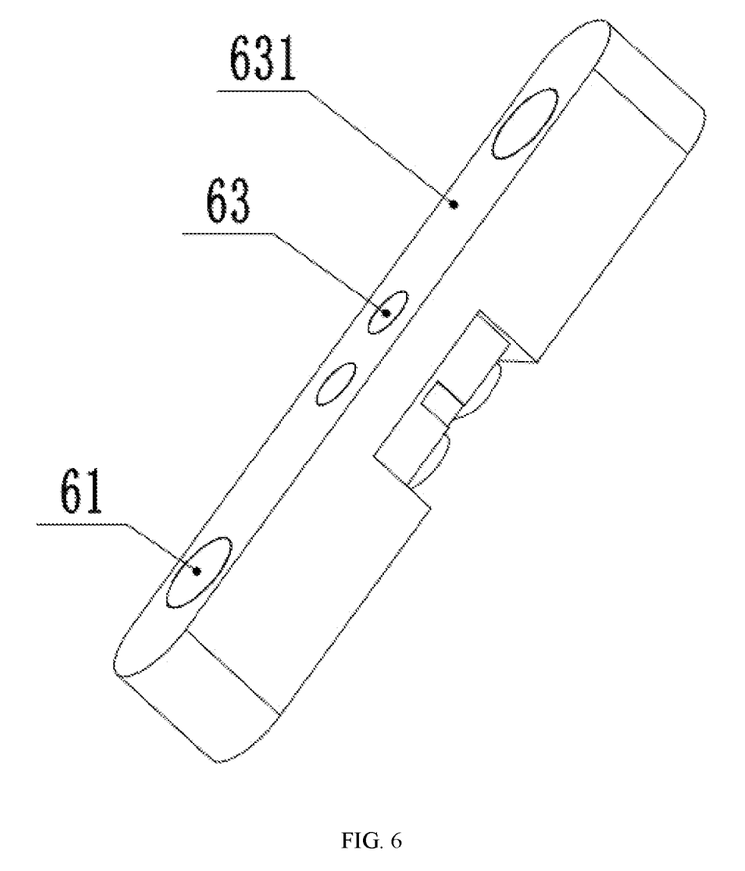
FIG. 6 is a schematic view of a female socket key and a magnetic particle according to the present disclosure.
Figure 7:
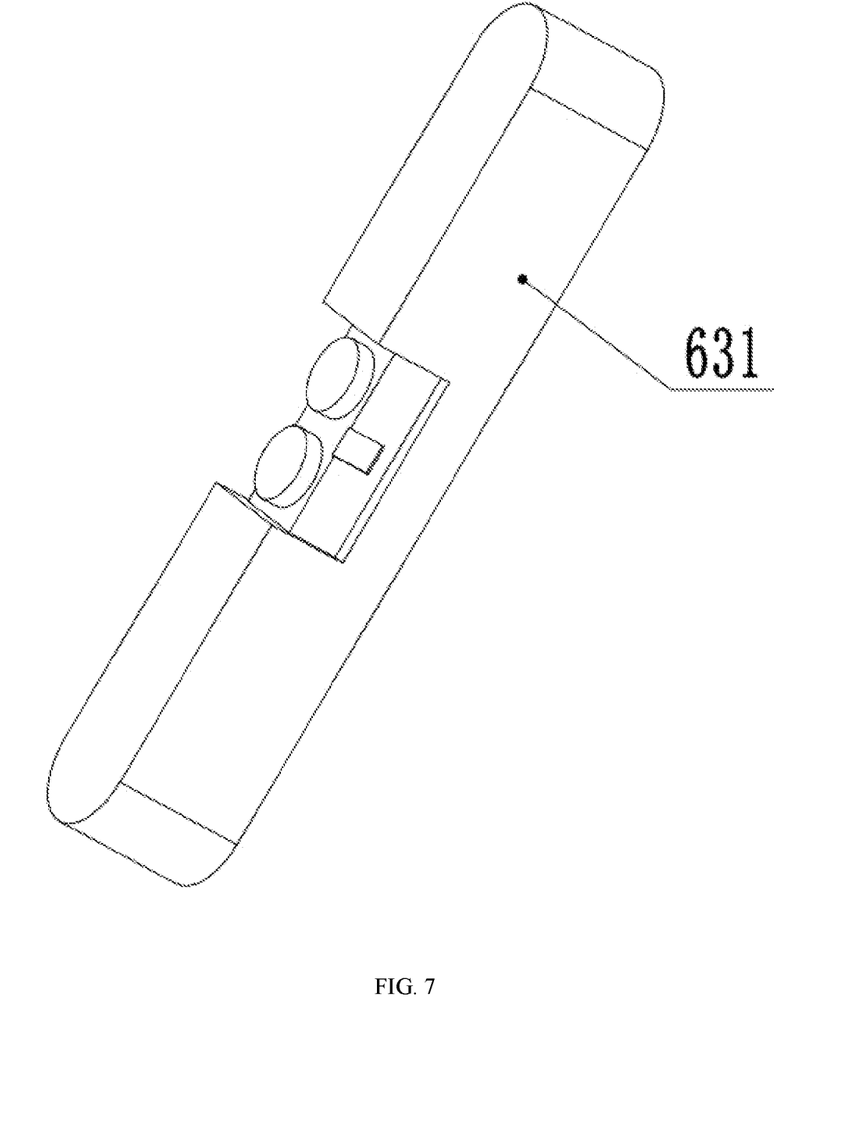
FIG. 7 is a schematic view of a female socket key according to the present disclosure.

In a further embodiment, the male pin 62 may be telescopically mounted on the male pin key 621.

In the above embodiment, in the magnetic power supplying key structure 6, the male pin key 621 and the female socket key 631 are formed by integral injection modeling of the male pin 62, the female socket 63, and the magnetic particles 61. In this embodiment, when the power supplying key structure is used, grooves corresponding to key sizes only need to be designed on a product to be closed and conducted, and hence the keys are embedded in the product, such that an assembly process of the discharging apparatus is greatly simplified, and production efficiency is improved.

The digital display unit 41, the control key 42, and the temperature detecting unit 43 may be integrated into the control module 4, and the control module 4 is further connected to the heating module 2 and the driving module 3, thereby implementing a uniform control of the discharging apparatus.

As described above, although the present disclosure has been described with reference to particular embodiments, these embodiments are not interpreted as causing limitations to the present disclosure. Without departing from the spirit and scope defined by the appended claims, variations or modifications may be made in terms of form and detail to the present disclosure.

The invention claimed is:

1. A discharging apparatus, applicable to a 3D printing device, comprising:
    a housing comprising a body portion, and a movable portion detachably or rotatably connected to the body portion, wherein one end of the body portion is provided with a discharging hole, and in an operating state, the body portion and the movable portion form a relatively enclosed accommodating space;
    a driving module, wherein one end of the driving module is connected to the body portion, and the other end of the driving module is movable by a predetermined distance in the accommodating space; and
    a heating module attached to an inner wall of the body portion and/or the movable portion, wherein the heating module is configured to adjust a heating temperature for heating according to a property of a printing material/or a discharging parameter.

2. The discharging apparatus according to claim 1, further comprising:
    a stocker disposed in the accommodating space and detachably mounted to the body portion, wherein the stocker is communicated with the discharging hole;
    wherein in the operating state, the other end of the driving module extends into the stocker.

3. The discharging apparatus according to claim 1, further comprising:
    a temperature detecting unit and a digital display unit;
    wherein the temperature detecting unit is disposed in an inner wall of the housing, and configured to detect a temperature of the accommodating space; and
    wherein the digital display unit is connected to the temperature detecting unit and/or the heating module, and configured to display the temperature of the accommodating space and/or set a temperature value.

4. The discharging apparatus according to claim 3, further comprising an input module, wherein the input module is configured to input a control parameter to the heating module and the driving module.

5. The discharging apparatus according to claim 1, wherein a magnetic power supplying key structure is disposed at a joint between the movable portion and the body portion, wherein the magnetic power supplying key structure comprises at least a pair of magnetic particles, and a male pin and a female socket that mate with each other by plugging;
    wherein each pair of magnetic particles magnetize each other, are correspondingly disposed on the body portion and the movable portion, and are configured to fix the movable portion and the body portion; and
    wherein the male pin and the female socket are correspondingly mounted on the movable portion and the body portion, and the heating module disposed on the movable portion is electrically conducted in response to the male pin and the female socket being in contact with each other.

6. The discharging apparatus according to claim 1, wherein the heating module comprises an aluminum heating tile, and a PI heating film attached to an outer wall of the aluminum heating tile.

7. The discharging apparatus according to claim 1, wherein the driving module comprises:

a power source, wherein the power source is fixedly connected to the body portion, and configured to output power;

a transmission assembly, wherein the transmission assembly is connected to the power source, and configured to convert rotation output by the power source into a linear reciprocating movement; and a piston, wherein the piston is connected to the transmission assembly, sealedly mates with an inner wall of a stocker, and linearly reciprocates in the stocker.

8. The discharging apparatus according to claim 1, wherein the heating module further comprises a metallic heating head detachably or fixedly connected to the discharging hole, wherein the metallic heating head is provided with a material through-hole along an axial direction of the metallic heating head, and is configured to heat the printing material in the material through-hole and at an end portion of the material through-hole.

9. The discharging apparatus according to claim 8, wherein the metallic heating head comprises a heating block detachably or fixedly connected to the accommodating space, wherein the heating block is provided with a mounting through-hole along an axial direction of the discharging hole; and a discharging head detachably or fixedly connected to the mounting through-hole, wherein the discharging head is provided with the material through-hole along the axial direction of the discharging hole;

wherein the heating block is configured to heat the printing material on the discharging head, in the installation through-hole, in the material through-hole, and at the end portion of the material through-hole.

10. The discharging apparatus according to claim 1, further comprising a connecting frame detachably or fixedly connected to the body portion, wherein the connecting frame is configured to be connected to a 3D printer.

11. The discharging apparatus according to claim 1, wherein the driving module comprises: a power source, wherein the power source is fixedly connected to the housing, and configured to output power;

a transmission assembly, wherein the transmission assembly is connected to the power source, and configured to convert rotation output by the power source into a linear reciprocating movement; and a plunger, wherein the plunger is connected to the transmission assembly, and configured to linearly reciprocates in a stocker;

wherein an end portion of the stocker sealedly mates with the housing.

12. A 3D printing device based on a discharging apparatus, comprising the discharging apparatus as defined in claim 1.

* * * * *